(12) United States Patent
Khandekar et al.

(10) Patent No.: US 8,254,927 B2
(45) Date of Patent: Aug. 28, 2012

(54) SFN AND SIGNALING MECHANISMS FOR SOFTER HANDOFF GROUPS

(75) Inventors: Aamod Khandekar, San Diego, CA (US); Alexei Gorokhov, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1245 days.

(21) Appl. No.: 11/852,964

(22) Filed: Sep. 10, 2007

(65) Prior Publication Data

US 2008/0096569 A1 Apr. 24, 2008

Related U.S. Application Data

(60) Provisional application No. 60/843,803, filed on Sep. 11, 2006.

(51) Int. Cl.
*H04W 36/00* (2009.01)
(52) U.S. Cl. ........ 455/436; 455/437; 455/438; 455/439; 455/440; 370/331; 370/332; 370/334; 370/328
(58) Field of Classification Search .......... 455/436–449; 370/331, 332, 334, 328
See application file for complete search history.

(56) References Cited

U.S. PATENT DOCUMENTS

| | | | |
|---|---|---|---|
| 6,360,098 B1* | 3/2002 | Ganesh et al. | 455/436 |
| 6,542,746 B1* | 4/2003 | Dean | 455/447 |
| 2005/0073971 A1 | 4/2005 | Mukai | |
| 2005/0288020 A1* | 12/2005 | Cho et al. | 455/436 |
| 2005/0288025 A1 | 12/2005 | Yoshida | |
| 2006/0194593 A1 | 8/2006 | Drabeck et al. | |

FOREIGN PATENT DOCUMENTS

| | | |
|---|---|---|
| CN | 1640169 A | 7/2005 |
| JP | 2006013826 A | 1/2006 |
| RU | 2004136306 | 5/2005 |
| WO | WO03096727 | 11/2003 |
| WO | WO2005034438 | 4/2005 |
| WO | WO2005043948 A2 | 5/2005 |
| WO | WO2005122628 | 12/2005 |

(Continued)

OTHER PUBLICATIONS

Chin-Chun Lee, "Effect of Soft and Softer Handoffs on CDMA System Capacity," IEEE Transactions on Vehicular Technology, 1998, vol. 47 (3).

(Continued)

*Primary Examiner* — Kamran Afshar
*Assistant Examiner* — Sayed T Zewari
(74) *Attorney, Agent, or Firm* — Francois A. Pelaez; Darren M. Simon

(57) ABSTRACT

Softer handoff groups are provided utilizing fractional frequency reuse set, which can be managed by a single master sector that is part of the group. The group can based on handoff rules that can include a group indication by an access point or a group request by an access terminal. A terminal is provided functionality to select a softer handoff group, which can be indicated by an active set update. An access point can discontinue serving terminals by groups by reducing an active set size to one. Diversity can be provided such that if a transmission from one sector fades, the other sector can provide the transmission, mitigating loss of data. Thus, robustness against inadequate channel conditions can be obtained.

46 Claims, 10 Drawing Sheets

FOREIGN PATENT DOCUMENTS

| WO | WO2005125262 | 12/2005 |
|----|---|---|
| WO | WO2006020032 | 2/2006 |
| WO | WO2006116105 | 2/2006 |

OTHER PUBLICATIONS

Qualcomm Europe, "Description and Simulations of Interference Management Technique of OFDMA bases E-UTRA Downlink Evaluation," 3GPP TSG-RAN WG1 #42, R1-050896, 2005.

Written Opinion—PCT/US2007/078111, International Search Authority—European Patent Office, Mar. 6, 2008.

International Search Report—PCT/US07/078111—International Search Authority, European Patent Office, Jun. 3, 2008.

China Unicom, et al.: "Joint Proposal for 3GPP2 Physical Layer for FDD Spectra; C30-20060731-040R4" [Online] Jul. 31, 2006, pp. 1-84.

Tinfang Ji, A.G.: "FFR Design for LBC FDD" [Online] Sep. 8, 2006, pp. 1-14.

Tomcik, J.: "MBFDD and MBTDD Wideband Mode: Technology Overview; IEEE C802.20-05/68r1" Internet Citation [Online] Jan. 6, 2006, pp. 1-109.

International Preliminary Report on Patentability, PCT/US2007/078111—The International Bureau of WIPO—Geneva, Switzerland, Mar. 17, 2009.

Taiwan Search Report—TW096133947—TIPO—Jun. 27, 2011.

* cited by examiner

SFN AND SIGNALING MECHANISMS FOR SOFTER HANDOFF GROUPS

CROSS-REFERENCE

This application claims the benefit of U.S. Provisional Application Ser. No. 60/843,803, filed Sep. 11, 2006, entitled "SFN AND SIGNALING MECHANISMS FOR SOFTER HANDOFF GROUPS IN LBC FDD," the entirety of which is incorporated herein by reference.

BACKGROUND

I. Field

The following description relates generally to wireless communication systems and more particularly to handoff groups in a wireless communication network.

II. Background

Wireless communication systems are widely deployed to provide various types of communication content such as voice, data, and other content. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project Long Term Evolution (3GPP LTE) systems, orthogonal frequency division multiple access (OFDMA) systems, and so forth.

Generally, a wireless multiple-access communication system can simultaneously support communication for multiple wireless terminals. Each terminal communicates with one or more base stations through transmissions on the forward and reverse links. The forward link (or downlink) refers to the communication link from base stations to the terminals, and the reverse link (or uplink) refers to the communication link from the terminals to the base stations. This communication link may be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the Ns independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

To effectuate continued coverage for terminals, the access points (base stations, access networks, etc.) associated with cellular networks are geographically positioned so as users (and associated terminals) change location they do not lose services. Thus, mobile stations can be "handed off" from a first base station to a second base station. In other words, a terminal will be serviced by a first base station while in a geographic region associated with such base station. When the terminal is transported to a region associated with a second base station, the terminal will be handed off from the first base station to the second base station. With hard handoff, the link to the prior base station is terminated before or as the user (e.g., associated terminal) is transferred to the new base station. Ideally, the handoff occurs without data loss, loss of service, and the like.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with providing data transmission and control signaling for forward link softer handoff groups. Diversity is provide such that if a transmission from one sector fades, another sector can provide the transmission, mitigating loss of data. Thus, robustness against inadequate channel conditions can be obtained. Included in one aspect is a method for enabling softer handoff groups. The method can include providing a fractional frequency reuse set associated with a softer handoff group and managing the fractional frequency reuse set by a master sector, the master sector being part of the softer handoff group Another aspect relates to a wireless communications apparatus comprising a processor and a memory. The processor can execute instructions for providing a fractional frequency reuse set associated with a softer handoff group and managing the fractional frequency reuse set by a master sector. The memory can store information related to a group identification and the softer handoff group generated by the processor.

In a related aspect is a wireless communications apparatus that assigns persistent group resources. The apparatus includes a means for providing a fractional frequency reuse set associated with a softer handoff group. Also included in apparatus is a means for managing the fractional frequency reuse set by a master sector, the master sector being part of the softer handoff group.

A further aspect relates to a machine-readable medium having stored thereon machine-executable instructions for providing a fractional frequency reuse set associated with a softer handoff group. The machine-executable instructions also manage the fractional frequency reuse set by a master sector, the master sector being part of the softer handoff group.

Still another aspect relates to an apparatus operable in a wireless communication system. The apparatus comprises a processor configured to provide a fractional frequency reuse set associated with a softer handoff group. The processor can also be configured to manage the fractional frequency reuse set using a master sector, the master sector being part of the softer handoff group. The apparatus also includes a memory coupled to the processor for storing data.

Another aspect relates to a method for selecting softer handoff groups. The method includes determining a master sector as a serving sector. Also included in method is choosing a softer handoff group that is offered by the master sector and indicating the chosen softer handoff group to the master sector In a related aspect is a wireless communications apparatus that includes a processor and a memory that stores information generated by the processor. The processor can execute instructions for receiving determining a master sector as a serving sector, and determining a desired softer handoff group offered by the master sector. The processor can also execute instructions for communicating the desired softer handoff group to the master sector.

A wireless communications apparatus that selects a softer handoff group is another aspect disclosed herein. The apparatus comprises a means for identifying a master sector as a serving sector. Also included is a means for selecting a softer handoff group offered by the master sector and a means for notifying the master sector of the selected softer handoff group.

A further aspect relates to a machine-readable medium having stored thereon machine-executable instructions for selecting a master sector as a serving sector. The machine-executable instructions can further choose a softer handoff group being offered by the master sector and communicate the chosen softer handoff group to the master sector.

Another aspect relates to an apparatus operable in a wireless communication system, the apparatus comprising a processor that can be configured to determine a master sector as its chosen sector. The processor can further be configured to choose a softer handoff group offered by the master sector and inform the master sector of the chosen softer handoff group.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
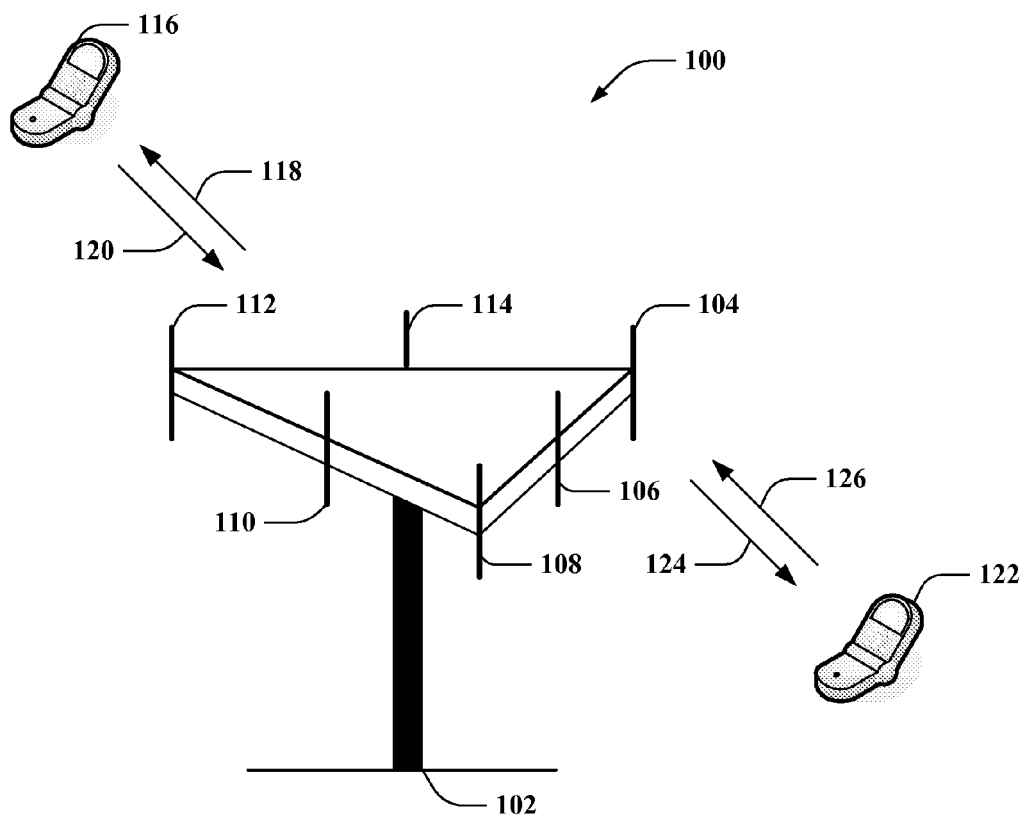
FIG. 1 illustrates a multiple access wireless communication system that can be utilized for softer handoff groups.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

With reference now to the drawings, FIG. 1 illustrates a multiple access wireless communication system 100 that can be utilized for softer handoff groups. System 100 includes an access point 102 (AP) that can include multiple antenna groups, one including 104 and 106, another including 108 and 110, and an additional group including 112 and 114. In FIG. 1, only two antennas are illustrated for each antenna group, however, more or fewer antennas may be utilized for each antenna group. Access terminal 116 (AT) is in communication with antennas 112 and 114, where antennas 112 and 114 transmit information to access terminal 116 over forward link 118 and receive information from access terminal 116 over reverse link 120. Access terminal 122 is in communication with antennas 106 and 108, where antennas 106 and 108 transmit information to access terminal 122 over forward link 124 and receive information from access terminal 122 over reverse link 126. In a Frequency Division Duplex (FDD) system, communication links 118, 120, 124 and 126 may use different frequencies for communication. For example, forward link 118 may use a different frequency then that used by reverse link 120. In accordance with some aspects, a single frequency network (SFN) can be utilized.

Each group of antennas and/or the area in which they are designed to communicate is often referred to as a sector of the access point. As illustrated, antenna groups can be designed to communicate to access terminals in a sector of the areas covered by access point 102.

In communication over forward links 118 and 124, the transmitting antennas of access point 102 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, a terminal, wireless terminal, a mobile station or some other terminology.

Figure 2:
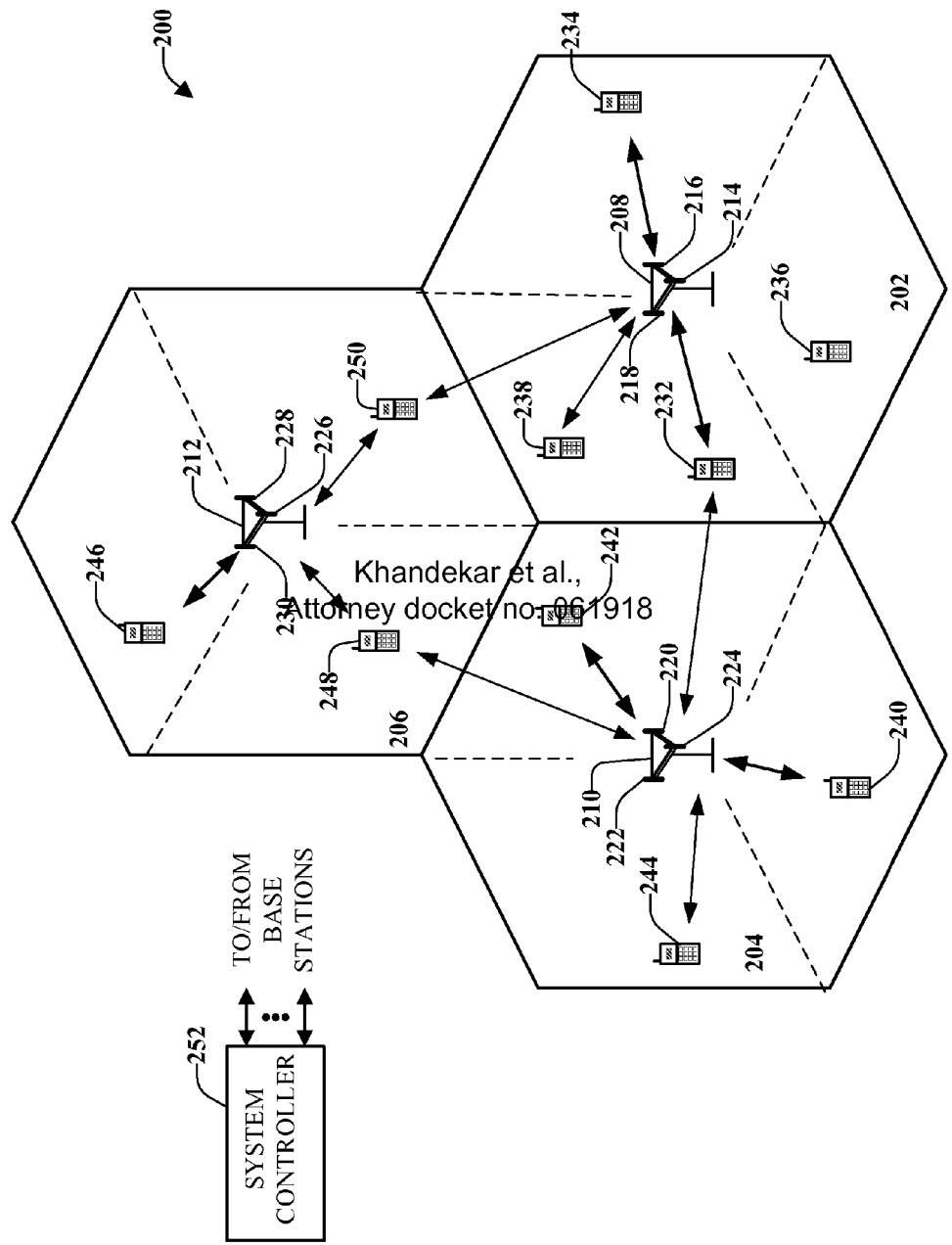
FIG. 2 illustrates a multiple access wireless communication system according to various embodiments for providing softer handoff groups.

FIG. 2 illustrates a multiple access wireless communication system 200 according to various embodiments for providing softer handoff groups. System 200 can facilitate at least two access points at substantially the same time serving an access terminal. Fractional frequency reuse sets can be utilized to provide a single frequency network (SFN). SFN typically refers to multiple base stations transmitting the same signal so that, at the terminal, it appears has if only a single base station is transmitting the signal. In the context of softer handoff, this behavior occurs only for a portion of the signal being transmitted by the base station (e.g., a single packet being transmitted to the terminal). This situation is referred to as "softer handoff." Frequency reuse provides the ability to use the same frequencies repeatedly within a single system. A reuse set associated with a softer handoff group can be managed by a single master sector, which can be part of the reuse set. The group can be based on handoff rules, such as a group indication by the access point, a group request by the access terminal, or combinations thereof. Channel quality reporting can remain similar to other systems.

In further detail, a multiple access wireless communication system 200 includes multiple cells, e.g. cells 202, 204, and 206. In the embodiment of FIG. 2, each cell 202, 204, and 206 may include an access point 208, 210, 212 that includes multiple sectors. The multiple sectors are formed by groups of antennas each responsible for communication with access terminals in a portion of the cell. In cell 202, antenna groups 214, 216, and 218 each correspond to a different sector. In cell 204, antenna groups 220, 222, and 224 each correspond to a different sector. In cell 206, antenna groups 226, 228 and 230 each correspond to a different sector.

Each cell includes several access terminals, which are in communication with one or more sectors of each access point. For example, access terminals 232, 234, 236, and 238 are in communication with base station 208, access terminals 240, 242, and 244 are in communication with access point 210, and access terminals 246, 248, and 250 are in communication with access point 212.

As illustrated in cell 204, for example, each access terminal 240, 242, and 244 is located in a different portion of it respective cell than each other access terminal in the same cell. Further, each access terminal 240, 242, and 244 may be a different distance from the corresponding antenna groups with which it is communicating. Both of these factors provide situations, also due to environmental and other conditions in the cell, to cause different channel conditions to be present between each access terminal and its corresponding antenna group with which it is communicating.

In accordance with some aspects, access terminals in a particular cell may be in communication with the access point associated with that cell and at substantially the same time be in communication with an access point associated with a different cell. For example, access terminal 232 may be in communication with access point 208 and 210; access terminal 248 may be in communication with access points 210 and 212; and access terminal 250 may be in communication with access points 208 and 212.

An access terminal in communication with two or more access points might receive a signal on the forward link from each access point, which is substantially the same signal (e.g., an access point impersonates another access point transparently to a terminal). However, access terminal might not know, or care, which access point it is in communication with because access terminal receives a signal that appears to be from a master sector. Thus, a different sector impersonates the master sector. On the reverse link, the access terminal can transmit and both sectors (e.g., access points) can listen and whichever access point has the better channel can serve the access terminal. Further information relating to this will be provided below in the following figures.

A controller 252 is coupled to each of the cells 202, 204, and 206. Controller 252 may contain one or more connections to multiple networks, such as the Internet, other packet based networks, or circuit switched voice networks that provide information to, and from, the access terminals in communication with the cells of the multiple access wireless communication system 200. Controller 252 includes, or is coupled with a scheduler that schedules transmission from and to access terminals. In some embodiments, scheduler may reside in each individual cell, each sector of a cell, or a combination thereof.

Each of the sectors can operate utilizing one or more of a plurality of carriers. Each carrier is a portion of a larger bandwidth in which the system can operate, or is available for communication. A single sector utilizing one or more carriers may have multiple access terminals scheduled on each of the different carriers during any given time interval (e.g., frame or superframe). Further, one or more access terminals may be scheduled on multiple carriers at substantially the same time.

An access terminal may be scheduled in one carrier or more than one carrier according to capabilities. These capabilities may be part of the session information that is generated when the access terminal attempts to acquire communication or that has been negotiated previously, may be part of the identification information that is transmitted by access terminal, or may be established according to another approach. In certain aspects, the session information may comprise a session identification token that is generated by querying the access terminal or determining its capabilities through its transmissions.

It should be noted that while FIG. 2, depicts physical sectors (e.g., having different antenna groups for different sectors), other approaches may be utilized. For example, utilizing multiple fixed "beams" that each cover different areas of the cell in frequency space may be utilized in place of, or in combination with, physical sectors.

Figure 3:
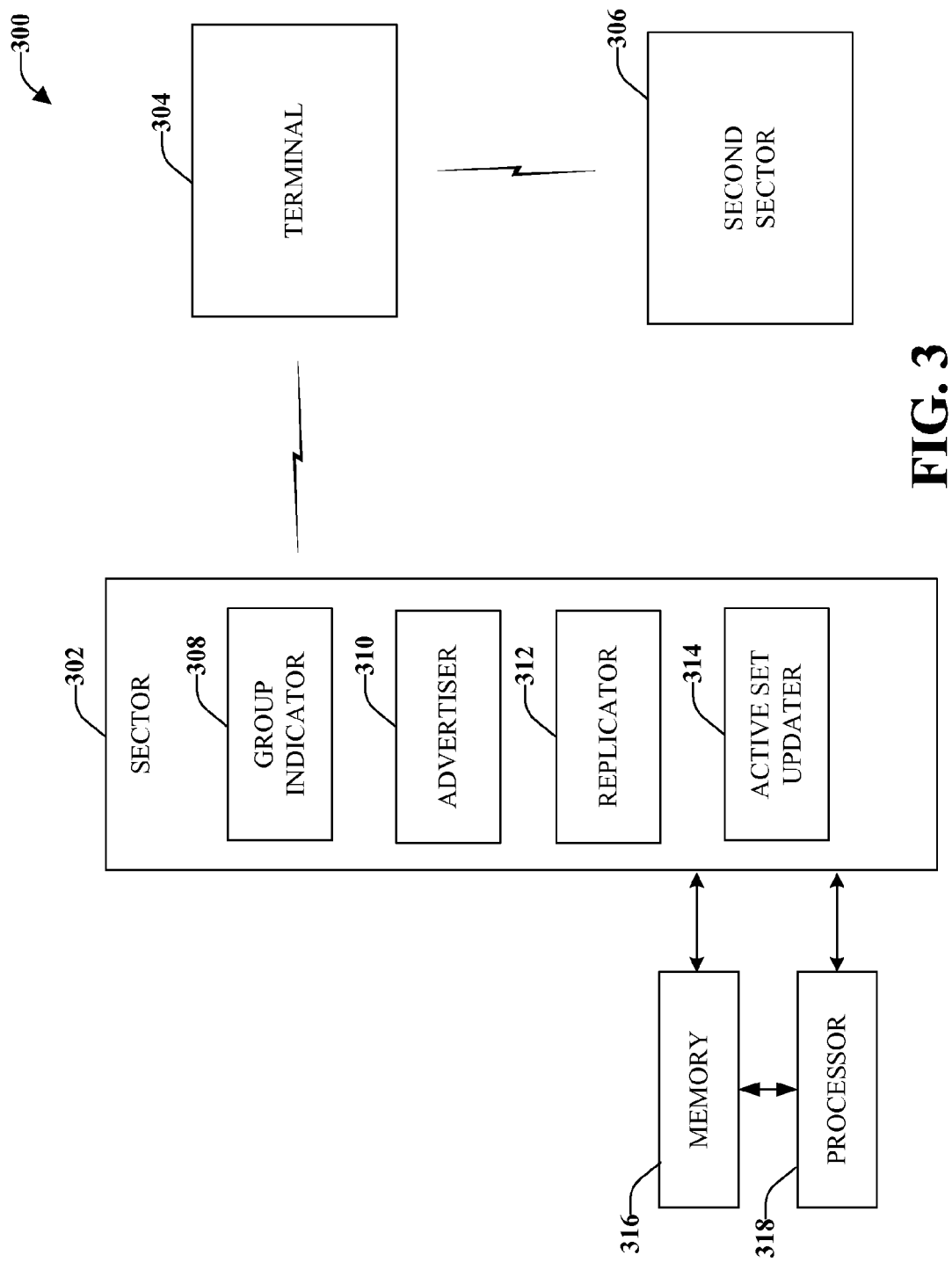
FIG. 3 illustrates an example system that facilitates softer handoff groups in UMB.

FIG. 3 illustrates an example system 300 that facilitates softer handoff groups in UMB. A terminal can be served by two sectors in the forward link at substantially the same time. The sectors can be included in the same cell, or in different cells, and can appear to the terminal to be the same sector by both sectors sending similar packets (e.g., one sector impersonates the other sector). The terminal can receive some information from both sectors, but might only believe the information has been received from the serving sector. System 300 can provide diversity such that if a transmission from one sector fades, the other sector can provide the transmission, mitigating loss of data. Thus, robustness against inadequate channel conditions can be obtained with system 300.

System 300 includes a sector 302 in communication with a terminal 304. Sector 302, if chosen by terminal 304 as described below, can be referred to as a master sector, which is part of a softer handoff group. A second sector 306 can also be in communication with terminal 304. It should be understood that more than one terminal and more than two sectors can be included in system 300 and the figure illustrated is for example purposes only. Additionally, it should be understood that the functionality illustrated and described with reference to sector 302 can be included in the functionality of second sector 306, although not illustrated.

To facilitate softer handoff groups, sector 302 can include a group indicator 308 that can be configured to determine which groups are available for softer handoff. Group indicator 308 can provide information relating to a first group identification, a second group identification, and so forth. In accordance with some aspects, the groups are static.

The group information can be communicated to an advertiser 310 that can be configured to notify terminal 304 of the softer handoff groups that can be supported in its sector and which are available to terminal 304. Sector 302 might broadcast this information through advertiser 310 if sector 302 is available and willing to participate by providing softer handoff. If sector 302 does not want to participate, advertiser 310 does not broadcast the information. If the sectors that are participating in softer handoff are included in the same cell, a single base station (not shown) can advertise this information. If the sectors are from different cells, the base stations for each respective sector can communicate in the backhaul.

The information broadcast by advertiser 310 might include an assignment message that includes resources, pilots, and other data. On the overhead channels, or other signaling, each sector, through respective advertisers 310, can advise access terminal 304 of the groups that are available. Each sector can be transmitting its pilots and terminal 304 can utilize the pilots to determine the strength of the signal from each sector and, therefore, the strength of the signals of each group.

Based in part on this information, terminal 304 can decide which group would be beneficial to communicate with and can request that a particular group be added to an active set (e.g., terminal is requesting to be served by two or more sectors). Once the terminal 304 has the group added to its active set, it can handoff to group members. The active set can indicate sectors to which terminal 304 can switch quickly. Thus, terminal 304 is provided the opportunity to select softer handoff groups.

Terminal 302 might assume SFN transmission from all sectors in the group and that it might not experience interference by a handoff terminal from group members. SFN operation can be achieved by sector 302 reserving a certain number of subbands/interlace pairs, which can be referred to as a port-set, in non-master members of the softer handoff group. Sector 302 can transmit forward link data to terminal 304 in all group members on resources assigned by master over some resources within the port set. Additionally, sector 302 can use a terminal-transparent form of transmit diversity, such as cyclic delay diversity or rotation diversity, for example.

Each sector 302 can choose a power profile and determine whether to transmit on a particular sub-band or not. Each sector 302 can further decide whether to transmit high-power or low power on each sub-band. This can be utilized to create frequency planning, such that some sub-bands might have full frequency reuse (e.g., all sectors are transmitting) and/or some sub-bands might have ⅓ frequency reuse (e.g., only one of every third sector transmits), and so forth.

Combining for the SFN operation can be facilitated by block hopping. The hopping is in groups that is divided into small blocks. There can be narrow band sequencing and each block can contain its own pilot, known as common pilots. The pilots are transmitted in a similar direction with similar power and data. If two different sectors are transmitting a block, the data matches and the pilots match, thus, terminal does not have to know which sector is transmitting. The terminal sees the pilot and measures some channels and the data is going to the same channels. Thus, this is transparent to the terminal.

There are other ways that this can be facilitated that is not transparent to the terminal. For example, if there is a common pilot that is common to all terminals, each sector can continuously transmit its own pilot. The access terminal separately estimates the channel from each base station and combines the two channels to obtain a joint channel. The data channel is transmitted by both sectors in an SFN manner (e.g., each sector transmits the same modulation symbols on the same subcarrier). The terminal can utilize the combined channel estimate from the two sectors to demodulate the data.

Neighboring sectors for a softer handoff group can blank out some sub-bands to its own users. Thus, when "Sector A" transmits to "User A", the user will not see any interference from "Sector B" because "Sector B" is blank. Alternatively or additionally, "Sector B", pretending to be "Sector A", can transmit power to "User A" and provide more power to "User A". Thus, a replicator 312 can be configured to imitate or duplicate signals sent from the sector chosen by terminal 304 (e.g., master sector). A sector 302 can transmit an assignment message and provide some resources and pilots. The other sectors 306 pretend to be sector 302 for the purposes of this particular terminal 304. The other sectors 306 (through respective replicators) can use similar scrambling patterns, similar hopping patterns, and similar pilot scrambling patterns and so on. Therefore, if sector 302 is chosen, sector 306 might pretend to be the chosen sector 302 and sector 306 can transmit extra energy on the hopping pattern of sector 302, providing the terminal 304 more energy.

Fine granularity of bandwidth partitioning can be provided. For example, in a 5 MHz system, there are eight time slots (e.g., eight interlaces) and one sub-band over one interlace can have approximately 4% granularity, which can minimize unnecessary bandwidth waste.

Scheduling can be dynamic and in any given slot a sector can decide whether to blank a sub-band or whether to transmit on the sub-band (e.g., multiple sectors transmitting). The channel quality can be supported based on the serving sector. In addition, bandwidth in fraction reuse can be used to schedule other (non-handoff) terminals, mitigating bandwidth waste.

Sector 302 can also include an active set updater 314 that can be utilized when sector 302 decides to stop serving terminals by groups. The decision can be based on pilot and/or channel quality indicator (CQI) reports and/or it can occur automatically when the active set size reduces to one (e.g., only one terminal in the set), or combinations thereof. Channel quality reports can be based on a channel quality of the master sector. Adequate channel quality is important for forward link control segment power control. However, it should be noted that the reports can be pessimistic for SFN transmission of forward data channel (F-DCH). However, gains are captured by rate prediction backoff loop and Hybrid Automatic Repeat-reQuest (H-ARQ) due to early terminations.

In H-ARQ, when a packet is sent to the user, if the packet or data frame is successfully decoded a positive acknowledgement (ACK) is sent to the transmitting device. If the packet is not successfully decoded, a retransmission request (e.g., more redundancy bits) is sent by the receiving device. A timeout, which provides a reasonable interval for the receiving device to respond with an ACK can be provided. If the ACK is not received at the transmitting device before expiration of the time, the data frame is resent, provided a predetermined number of attempts has not been exceeded. Provided the information is successfully decoded, the receiving device combines the information from subsequent transmissions with the information received from the first transmission. As a result of H-ARQ, if the receiving device reports a CQI that is too small, the receiving device will still gain from the improved signal quality from all sectors because decoding can successfully finish after a smaller number of transmissions.

Channel quality reporting with softer handoff support can be similar to traditional channel quality reporting. A reverse link channel quality control indicator (R-CQICH) can report "control CQI". Channel quality indicator value (VCQI) reports can capture long term CQI per sub-band per interlace through upper layer signaling. VCQI reports can be sent through upper layer messaging. A reverse link subband feedback channel (R-SFCH) in UMB can capture "sub-band CQI". A reverse link beam feedback channel (R-BFCH) and a reverse-link MIMO channel quality indicator can report "MIMO CQI." It should be noted that the information described previously is generic to any communication system, however, the control channels described in this paragraph are in the context of a Ultra Mobile Broadband (UMB) system.

Upon deciding to discontinue serving terminals by groups, active set updater 314 sends an "Active Set Update" which reduces group sizes to one (e.g., no groups available with this terminal). The messaging by active set updater 314 does not have to be time critical and merely mitigates the terminal from continuously requesting group based handoffs after a sector 302 decides to stop serving the terminal 304.

System 300 can include memory 316 operatively coupled to sector 302. Memory 316 can store information related to a group identification, a group member index, an active set, and other data generated by the processor. In accordance with some aspects, memory 316 can store information related to frequency reuse and other suitable information related to softer handoff groups in a communication network. A processor 318 can be operatively connected to sector 302 (and/or memory 316) to execute instructions relating to creating softer handoff groups based on an indication by an access point or a request by an access terminal.

In accordance with some aspects, processor 318 can execute instructions relating to analysis of SFN operation and/or quality reporting related to softer handoff groups in a communication network. Processor 318 can execute instructions for creating a active set, selectively determining whether to serve a particular access terminal, sending information substantially similar to information sent by other sector (e.g., mimicking another sector), and so forth.

Processor 318 can be a processor dedicated to analyzing and/or generating information received by sector 302 (e.g., active group selection, location of user devices, and so forth). Processor 318 can also be a processor that controls one or more components of system 300, and/or a processor that both analyzes and generates information received by sector 302 and controls one or more components of system 300.

Memory 316 can store protocols associated with assigning resources to a group, creating a Group ID, taking action to control communication between sector 302 and terminal 304, etc., such that system 300 can employ stored protocols and/or algorithms to achieve softer handoff groups in a wireless network as described herein.

It should be appreciated that the data store (e.g., memories) components described herein can be either volatile memory or nonvolatile memory, or can include both volatile and non-volatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 316 of the disclosed embodiments are intended to comprise, without being limited to, these and other suitable types of memory.

Figure 4:
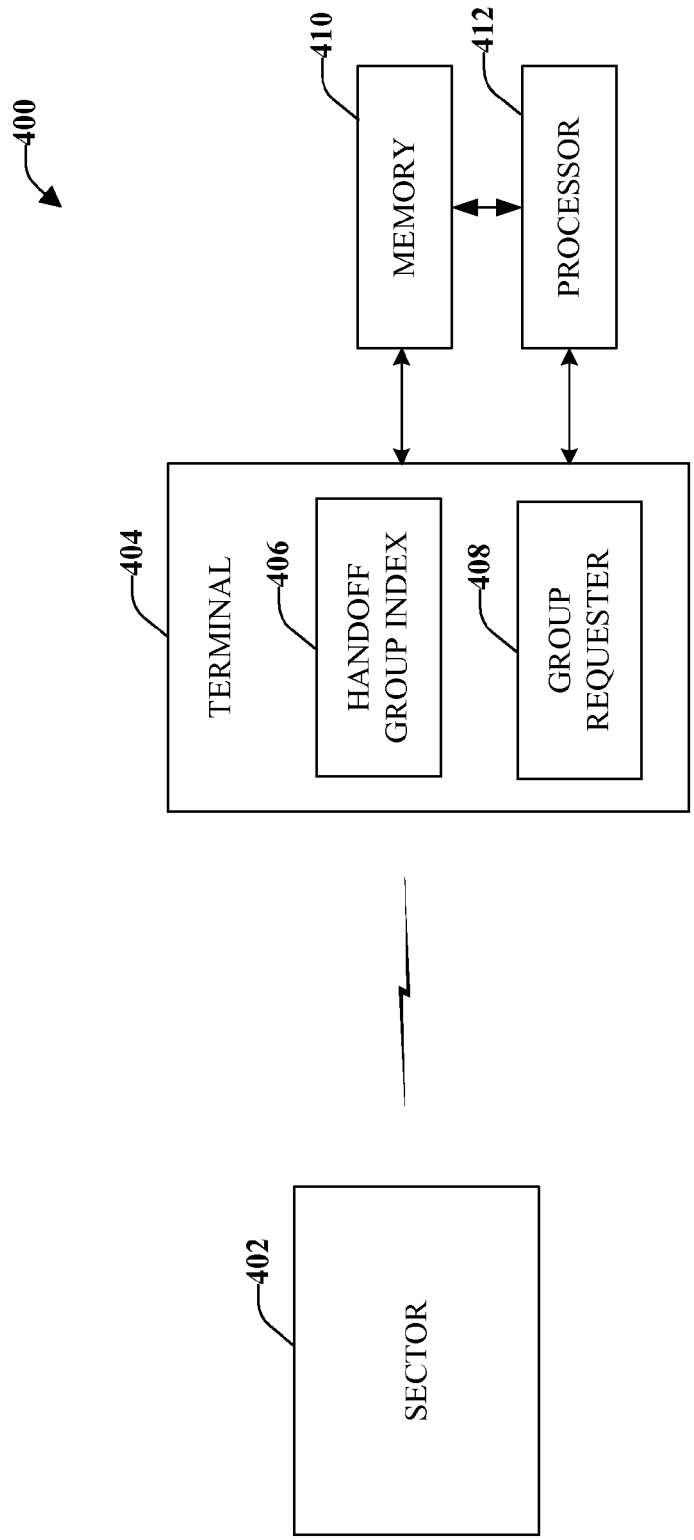
FIG. 4 illustrates an example system that facilitates softer handoff group selection.

FIG. 4 illustrates an example system 400 that facilitates softer handoff group selection. System 400 includes one or more sectors 402 in communication with one or more terminals 402 (only one of each is shown for purposes of simplicity). Terminal 404 is provided the functionality to select a softer handoff group, which can be indicated by an active set update. The softer handoff groups can be defined by the terminal 404 and comprise a set of sectors from the active set of the terminal with a master sector corresponding to each group.

One or more sectors 402 can advertise to terminal 404 that it is available for softer handoff. Each sector is transmitting its pilots and terminal 404 can utilize those pilots to determine the strength of each sector and, therefore, the strength of each group. Based in part on this information, terminal 404 can determine which group would be more beneficial and can request that it be served by the group that has been determined to be more beneficial.

Terminal 402 can include a handoff group index 406 that can be accessed by a group requester 408 that can be configured to indicate the group index desired during a forward link handoff request. The group index 406 can be populated with sectors 402 that are participating in softer group handoff. A reverse channel quality indicator channel (R-CQICH) can be scrambled with the identifier (ID) of the softer handoff group desired by the terminal during a forward link switching request. The switching request can be indicated by setting a Desired Forward Link serving sector (DFLSS) flag. The switching request indicates switching of a master (FLSS) and/or SFN group.

Thus, the group requester 408 can indicate which softer handoff group it desires to serve terminal 404. The indication can be sent by using scrambling on a CQI channel (e.g., each softer handoff group in the active set has an index, known in UMB as the Softer Handoff Group index (SHOGID)). The terminal 404 scrambles its CQI reports, which correspond to the CQI of the master sector only, with the SHOGID in order to indicate the desired group to the base station. Once the terminal 404 has the group added to its active set, it can handoff to group members. The active set can indicate sectors to which terminal 404 can switch quickly. Thus, terminal 404 is provided the opportunity to select softer handoff groups.

The terminal 404 operates as if it is only communicating with to one sector), although more than one may have been selected for softer handoff. The sectors operate together and at substantially the same time send data to terminal 404, which receives the data as if it was transmitted by the selected sector 402 (e.g., it is transparent to terminal 404 which sector's transmission is actually received). Terminal 404 notifies one sector that it is the serving sector for the terminal 404 and that terminal 404 desires to be served by a given group. For example, sector 402 can notify terminal 404 that there are four groups available to terminal 404, and terminal 404 can select among those four groups.

After selecting the group, the terminal 404 operates as it is communicating with just the selected sector. For example, in an OFDM system there are hopping patterns, scheduling of messages, and other events that utilize the channelization of the terminal and the recipient of the communication. For all these purposes, the terminal 404 is communicating to the serving sectors. Thus, the terminal 404 is treating the groups of sectors as one sector and performing the operation it would normally perform. However, the terminal 404 is receiving more energy because more than one sector is involved.

Additionally, CQI feedback information, which is used by a base station for correction, is determined only based on the serving sector. Terminal 404 is not relying on the other transmitting sectors, but if there are other sectors giving extra energy, it means the transmission may be more reliable and/or supports H-ARQ. This means packets can last multiple H-ARQ transmissions and can terminal earlier, saving bandwidth.

On the reverse-link, the terminal 404 transmits and both sectors attempt to hear the transmission. Which ever sector has the better transmission serves the terminal 404. In accordance with some aspects, the sectors can combine the signal. Thus, on the reverse-link there are no extra resources utilized because the same signal is transferred to two sectors. On the forward-link, however, there are extra resources used because both sectors are reserving resources.

System 400 can include memory 410 operatively coupled to terminal 404. Memory 410 can store information related to handoff group indexes. A processor 412 can be operatively connected to terminal 404 (and/or memory 410) and can execute instructions for determining which sector is more beneficial and should be used to serve terminal 404, requesting a particular sector, indicating a softer handoff group index during a forward link handoff request, and so on.

Processor can further execute instructions for receiving information from at least two sectors participating in a softer handoff group, determining a master sector from the at least two sectors, creating a CQI report for the master sector, scrambling the CQI report with an index associated with the softer handoff group, and transmitting the scrambled CQI report and index on a CQI channel. In accordance with some aspects, the processor further executes instructions for receiving at least two pilots, each pilot transmitted from each of the at least two sectors, estimating a channel for each sector based on the received pilots, combining the channel estimates, and utilizing the combined channel estimates to demodulate data. Processor can further execute instructions for receiving a pilot transmitted by each of the at least two sectors and determining a strength of each sector based on the received pilots.

Additionally or alternatively, processor 412 can execute instructions for communicating with the master sector, wherein the communication is received by the master sector or a different sector in the softer handoff group. Other instructions can include receiving information from the master sector, wherein the information is from the master sector or from a different sector participating in the softer handoff group. The information from a different sector participating in the softer handoff group can be information that appears to be the information sent by the master sector.

Processor 412 can be a processor dedicated to analyzing and/or generating information received by terminal 404, a processor that controls one or more components of system 400, and/or a processor that both analyzes and generates information received by terminal and controls one or more components of system 400.

Memory 410 can store protocols associated with generating acknowledgments, receiving scheduling information, taking action to control communication between terminal 404 and sector 402, etc., such that system 400 can employ stored protocols and/or algorithms to achieve group resource management in a wireless network as described herein.

Figure 5:
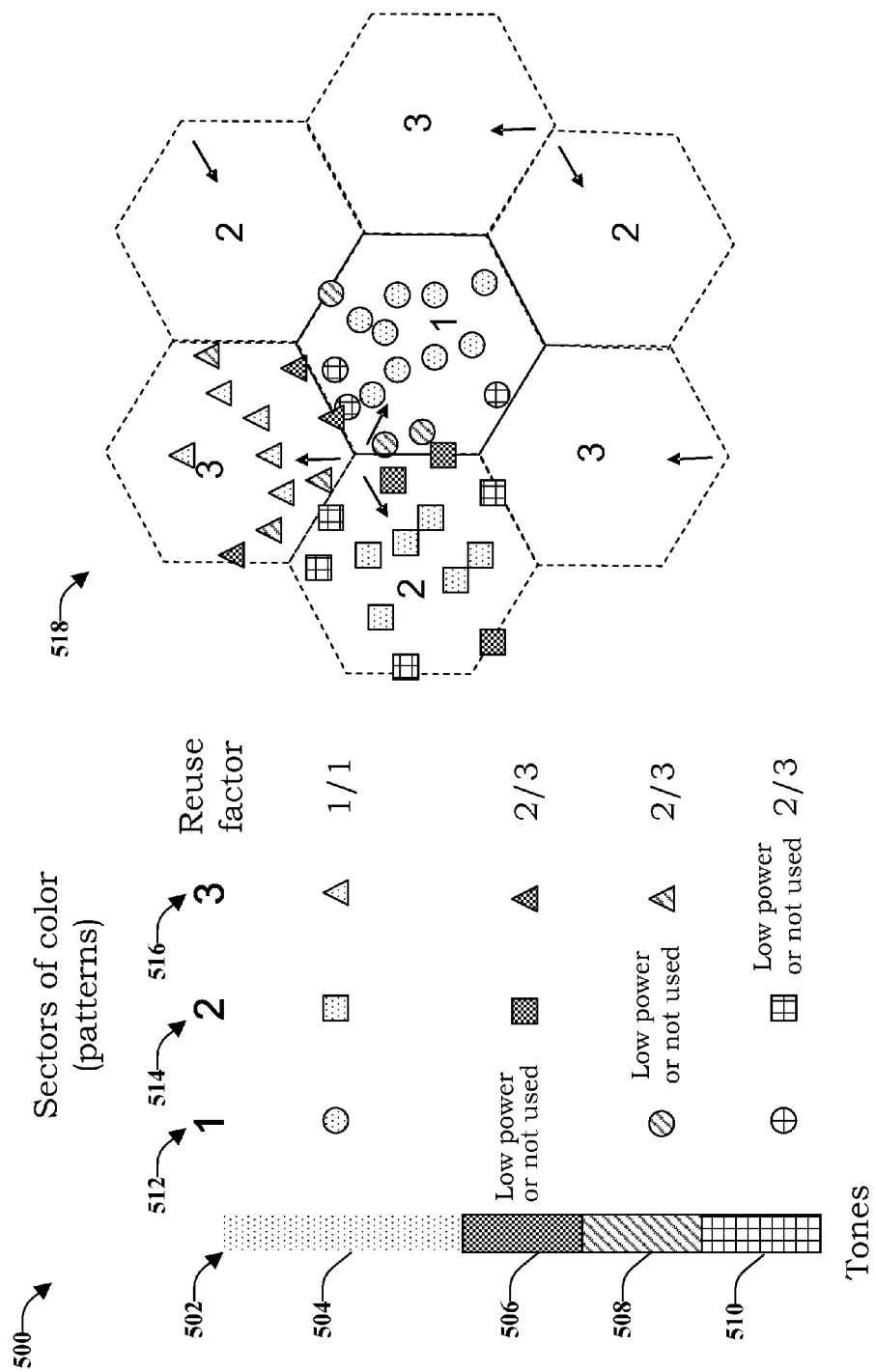
FIG. 5 illustrates an example representation of fractional frequency reuse.

FIG. 5 illustrates an example representation 500 of fractional frequency reuse. This example representation 500 illustrates potential capacity gain given a good C/I and bandwidth tradeoff. Fractional Frequency Reuse (FFR) can be full or partial frequency reuse. The entire bandwidth can be divided into slots, referred to as interlaces, and into bandwidth slots called sub-bands, wherein hopping is within a sub-band. A sub-band in a first sector will collide only with the same sub-band in a second sector. There is no hopping across the bands.

Illustrated are four different reuse patterns 502 (or color). The first reuse pattern 504 can have a reuse factor of 1/1; the second reuse pattern 506 can have a reuse factor of 2/3; the third reuse pattern 508 can have a reuse factor of 2/3; and a fourth reuse pattern can have a reuse factor of 2/3, for example. In UMB, a different reuse pattern can be chosen for each subband on each interlace.

Sector "1", illustrated at 510, the second reuse pattern 506 has low power, or is not used. For sector "2" 514, the third reuse pattern 508 has low power, or is not used. For sector "3" 516, the fourth reuse pattern has low power or is not used. A graphical representation of devices within various sectors that utilize fractional frequency reuse is illustrated at 518.

Figure 6:
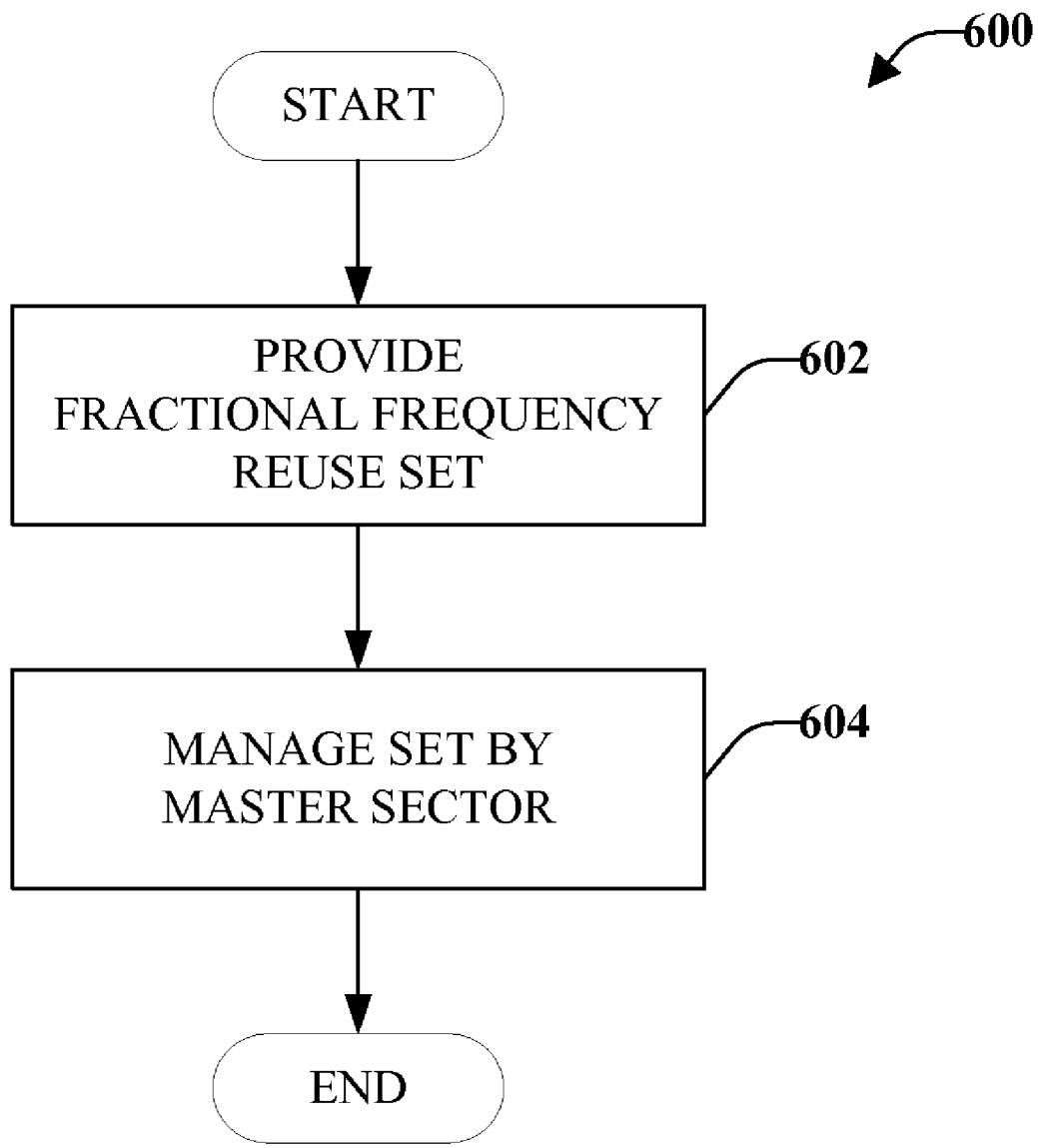
FIG. 6 illustrates a method for enabling softer handoff groups.
Figure 7:
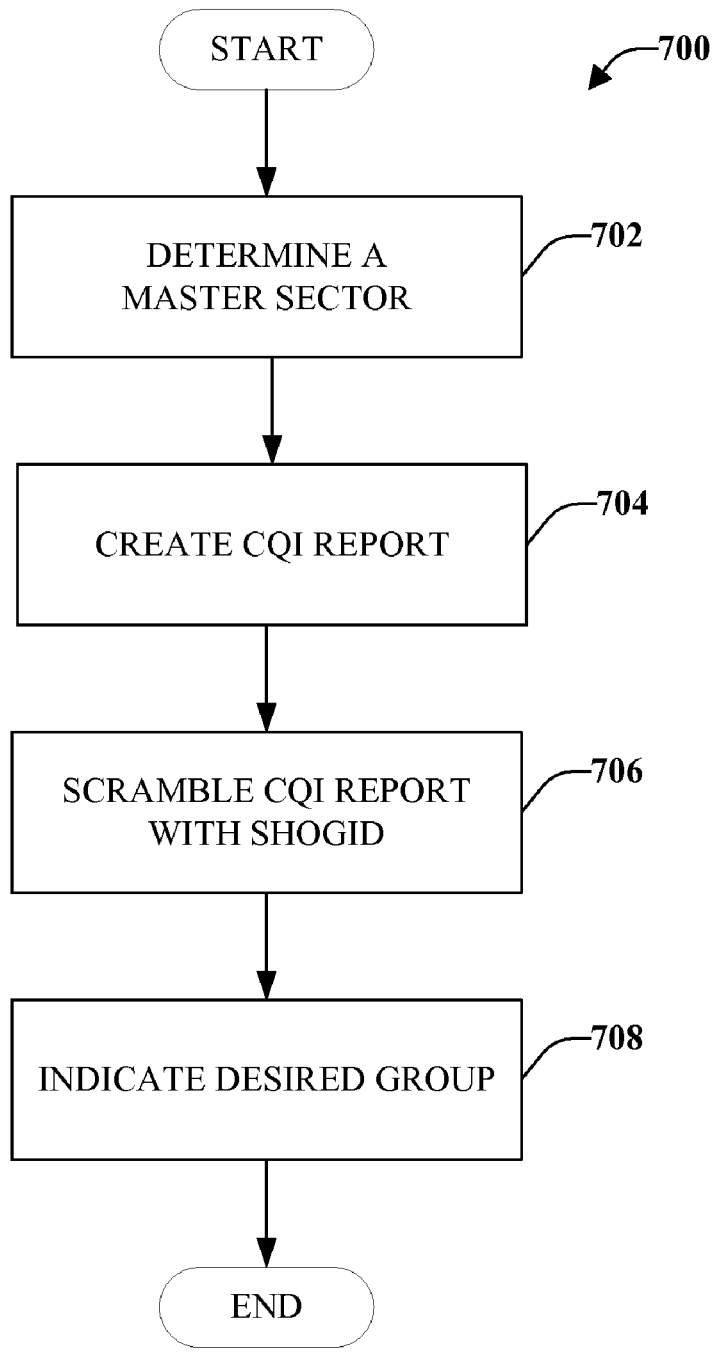
FIG. 7 illustrates a method for selecting softer handoff groups.

In view of the exemplary systems shown and described above, methodologies that may be implemented in accordance with the disclosed subject matter, will be better appreciated with reference to the flow charts of FIGS. 6 and 7. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

With reference to FIG. 6, illustrated is a method 600 for enabling softer handoff groups. At 602, a fractional frequency reuse set associated with a softer handoff group is provided. The information relating to the softer handoff group can be advertised to one or more terminals that might want to be served by more than one sector. The terminal can request that a particular sector be its serving sector (e.g., the terminal is provided the ability to select a serving sector). This determination can be made based on the channel quality of the sector or based on other information that indicates a particular sector would be more useful to terminal.

At 604, the fractional frequency reuse set is managed by a master sector. The master sector can be part of the softer handoff group (e.g., one of the sectors in the group). Other sectors within the group might mimic (or send the same or substantially similar) packets or communications transmitted by the master sector to the terminal and send the copied or mimicked signal to the terminal. In accordance with some aspects, the signal of the master sector can be sent as well as the signal of a second sector (which is a copy of the master sector signal) and both signals transmitted to the terminal. Thus, master sector and the impersonating sector can use similar scrambling patterns, similar hopping patterns, and similar pilot scrambling patterns and so on. Therefore, if a first sector is chosen, a second sector might pretend to be the chosen sector and the second sector can transmit extra energy on the hopping pattern of the chosen sector, providing the terminal more energy. However, the terminal might be unaware that the packets are arriving from two sectors and/or from the second sector, not the master sector. Thus, the actual sector sending the packet is transparent to the terminal.

In accordance with some aspects, it might be determined to no longer continue serving terminals by group. Such a determination can be made based on various factors such as reviewing pilots, channel quality indicator reports, automatically when the group size is reduced to one, or combinations thereof. If it is determined that the terminals will no longer be served by groups, an active set update can be transmitted to reduce a group size to one if the determination is to not continue serving the plurality of terminals by group.

FIG. 7 illustrates a method 700 for selecting softer handoff groups. Method 700 can facilitate at least two access points at substantially the same time serving an access terminal. Fractional frequency reuse sets can be utilized to provide a single frequency network (SFN).

Method 700 starts, at 702, when a terminal receives information from sectors participating in softer handoff groups and determines which base station would be best to serve the terminal. Each sector can advertise whether it is available (and willing) to serve the terminal. For example, the sector can notify terminal that there are four groups available to terminal, and terminal can select among those four groups. Terminal can receive a pilot from each sector and can utilize the pilots to determine the strength of each sector and, thus, the strength of each group. Based in part on this information, the terminal determines which group is the better group to serve the terminal. A handoff group index can be populated to indicate the group index desired during a forward link handoff request. The group index can be populated with sectors that are participating in the softer group handoff.

At 704, the terminal creates a CQI report that can correspond to the CQI of a master sector only. Thus, the created CQI report does not contain information relating to other sectors that might be serving the terminal. The CQI report can be sent as CQI feedback information, which is used by a base station in the master sector for correction.

To indicate the softer handoff group desired by the terminal during a handoff request, at 706, the terminal scrambles its CQI report with an index associated with the desired softer handoff group (SHOGID). The scrambling can be used on the CQI channel to indicate the desired group to the base station, at 708. The indication can be transmitted to the base station during a handoff request. Once the terminal has the group added to its active set, it can handoff to group members. The active set can indicate sectors to which terminal can switch quickly. Thus, terminal is provided the opportunity to select softer handoff groups.

After selecting the group, the terminal operates as it is communicating with just the selected sector. The terminal receives information from the master sector, or from a different sector that is mimicking the information sent by the master sector. Thus, whether the information is actually received from the master sector of the different sector is not known by the terminal, because it appears the information is from the master sector. For example, in an OFDM system there are hopping patterns, scheduling of messages, and other events that utilize the channelization of the terminal and the recipient of the communication. For all these purposes, the terminal is communicating to the serving sectors. Thus, the terminal is treating the groups of sectors as one sector and performing the operation it would normally perform. However, the terminal is receiving more energy because more than one sector is involved.

Additionally, on the reverse-link, the terminal transmits and both sectors attempt to hear the transmission. The sector that has the better transmission serves the terminal, it is transparent to the terminal which sector is currently serving the terminal.

In accordance with some aspects, if there is a pilot that is common to all terminals, each sector can continuously transmit its own pilot. The access terminal separately estimates the channel from each base station and combines the two channels to obtain a joint channel. The data channel is transmitted by both sectors in an SFN manner (e.g., each sector transmits the same modulation symbols on the same subcarrier). The terminal can utilize the combined channel estimate from the two sectors to demodulate this data.

Figure 8:
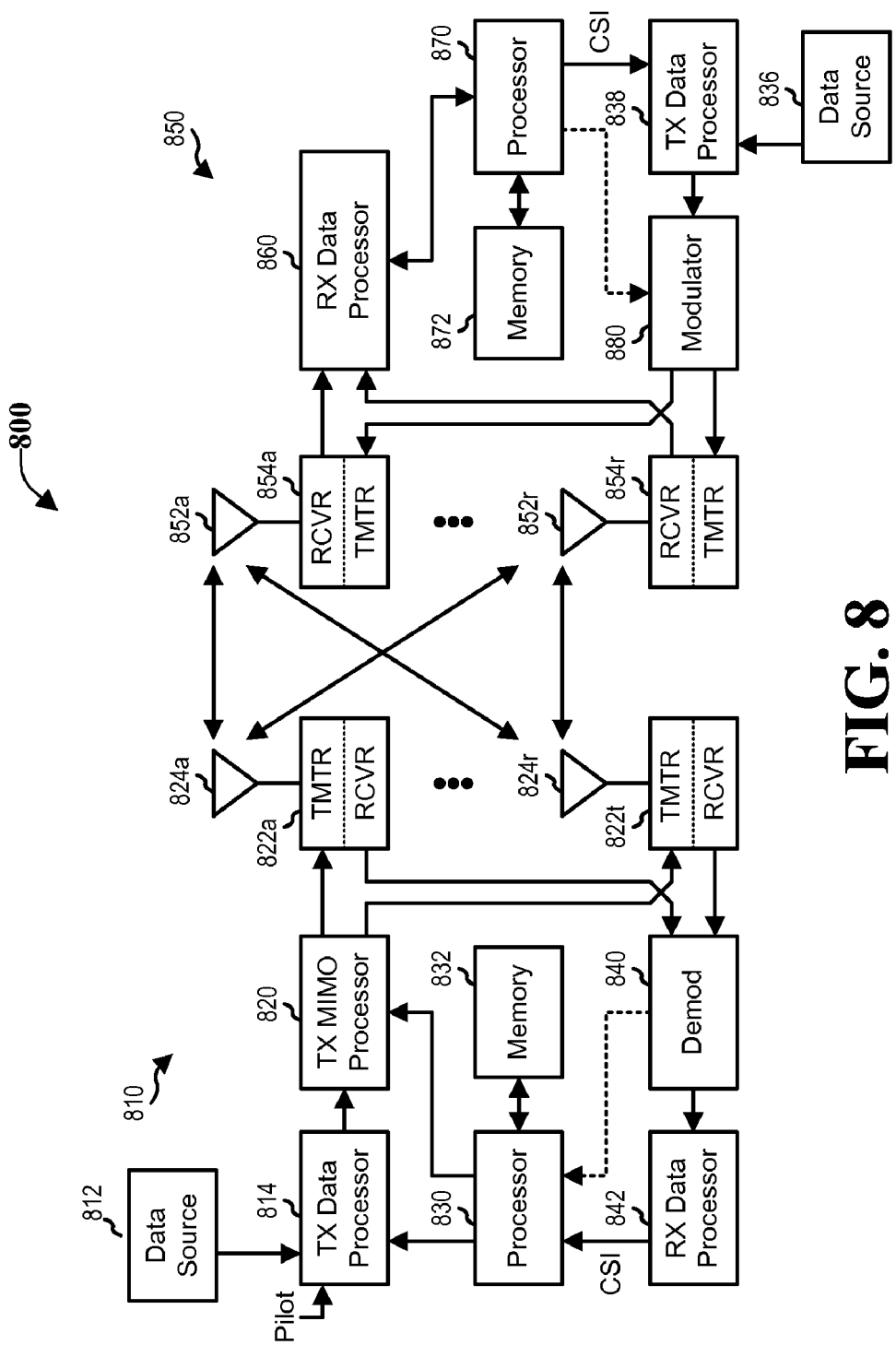
FIG. 8 illustrates a block diagram of an embodiment of a transmitter system and a receiver system.

FIG. 8 illustrates a block diagram of an embodiment of a transmitter system 810 (also known as the access point) and a receiver system 850 (also known as access terminal) in a MIMO system 800. At the transmitter system 810, traffic data for a number of data streams is provided from a data source 812 to a transmit (TX) data processor 814.

In accordance with some aspects, each data stream is transmitted over a respective transmit antenna. TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 830.

The modulation symbols for all data streams are then provided to a TX MIMO processor 820, which may further process the modulation symbols (e.g., for OFDM). TX MIMO processor 820 then provides $N_T$ modulation symbol streams to $N_T$ transmitters (TMTR) 822a through 822t. In some embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 822a through 822t are then transmitted from $N_T$ antennas 824a through 824t, respectively.

At receiver system 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective received signal, digitizes the conditioned signal to provide samples, and further processes the samples to provide a corresponding "received" symbol stream.

An RX data processor 860 then receives and processes the $N_R$ received symbol streams from $N_R$ receivers 854 based on a particular receiver processing technique to provide $N_T$ "detected" symbol streams. The RX data processor 860 then demodulates, deinterleaves, and decodes each detected symbol stream to recover the traffic data for the data stream. The processing by RX data processor 860 is complementary to that performed by TX MIMO processor 820 and TX data processor 814 at transmitter system 810.

A processor 870 periodically determines which pre-coding matrix to use (discussed below). Processor 870 formulates a reverse link message comprising a matrix index portion and a rank value portion.

The reverse link message may comprise various types of information regarding the communication link and/or the received data stream. The reverse link message is then processed by a TX data processor 838, which also receives traffic data for a number of data streams from a data source 836, modulated by a modulator 880, conditioned by transmitters 854a through 854r, and transmitted back to transmitter system 810.

At transmitter system 810, the modulated signals from receiver system 850 are received by antennas 824, conditioned by receivers 822, demodulated by a demodulator 840, and processed by a RX data processor 842 to extract the reserve link message transmitted by the receiver system 850. Processor 830 then determines which pre-coding matrix to use for determining the beamforming weights then processes the extracted message.

Figure 9:
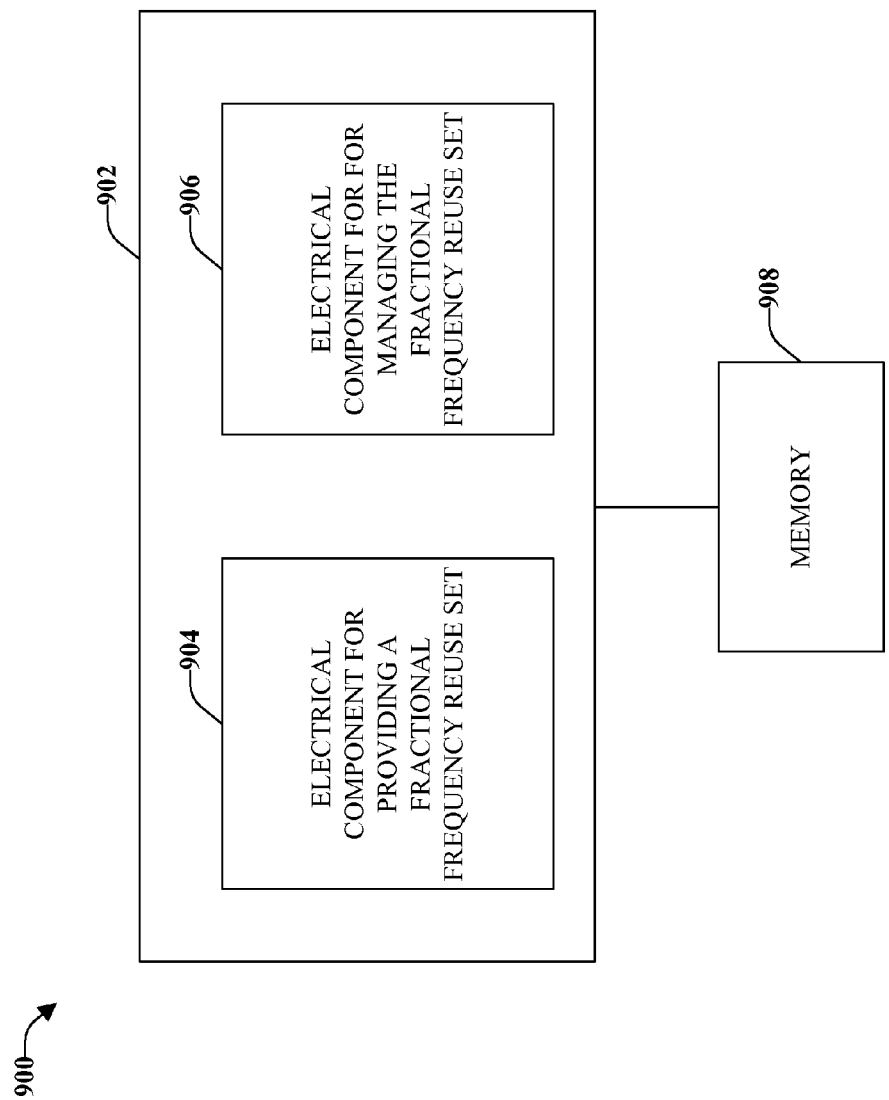
FIG. 9 illustrates an example system for providing softer handoff groups.

With reference to FIG. 9, illustrated is an example system 900 for providing softer handoff groups. For example, system 900 may reside at least partially within a base station. It is to be appreciated that system 900 is represented as including functional blocks, which may be functional blocks that represent functions implemented by a processor, software, or combination thereof (e.g., firmware).

System 900 includes a logical grouping 902 of electrical components that can act separately or in conjunction. For instance, logical grouping 902 may include an electrical component for providing a fractional frequency reuse set associated with a softer handoff group 904. Further, logical grouping 902 can comprise an electrical component for managing the fractional frequency reuse set by a master sector, the master sector being part of the softer handoff group 906.

In accordance with some aspects, logical grouping 902 can include an electrical component for copying a signal of the master sector with a signal of a second sector (not shown) and an electrical component for sending the copied signal to an access terminal being served by the master sector (not shown). Additionally or alternatively, logical grouping 902 can include an electrical component for deciding whether to continue serving a plurality of terminals by group and a logical component for transmitting an active set update to reduce a group size to one if the determination is to not continue serving the plurality of terminals by group (not shown).

In accordance with some aspects, logical grouping 902 can include an electrical component for reviewing pilots and channel quality indicator reports and an electrical component for detecting if a group size is reduced to one. Also included can be an electrical component for allowing a terminal to determine which sector within the softer handoff group is to serve the terminal.

Additionally, system 900 can include a memory 908 that retains instructions for executing functions associated with electrical components 904 and 906 or other components. While shown as being external to memory 908, it is to be understood that one or more of electrical components 904 and 906 may exist within memory 908.

Figure 10:
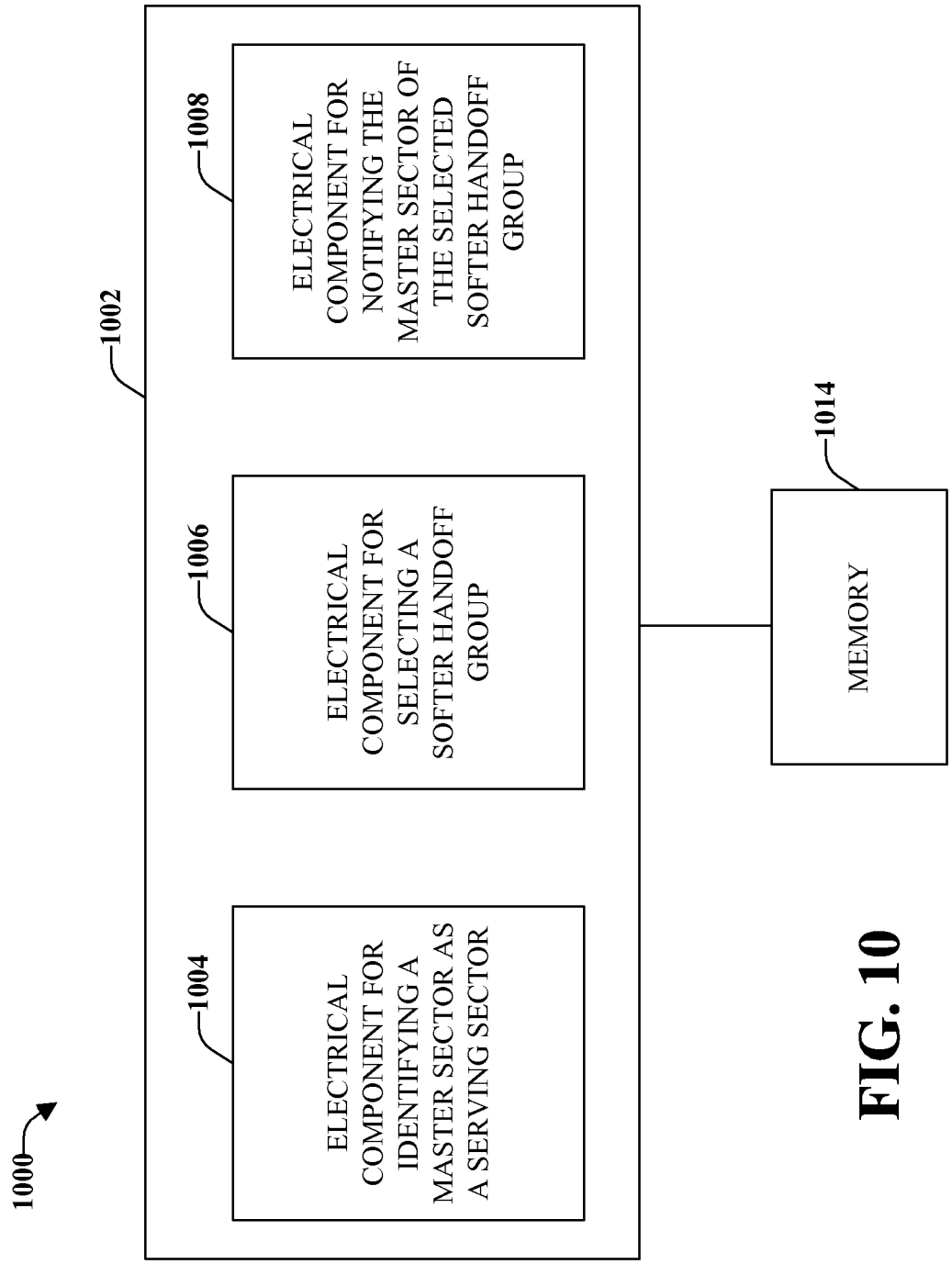
FIG. 10 illustrates an example system for selecting softer handoff groups.

FIG. 10 illustrates an example system 1000 for selecting softer handoff groups. For example, system 1000 may reside at least partially within an access terminal. It is to be appreciated that system 1000 is represented as including functional blocks, which may be functional blocks that represent functions implemented by a processor, software, or combination thereof (e.g., firmware).

System 1000 includes a logical grouping 1002 of electrical components that can act separately or in conjunction. Logical grouping 1002 may include an electrical component for identifying a master sector as a serving sector 1004. Also included can be an electrical component for selecting a softer handoff group offered by the master sector 1004. The master sector can providing one or more softer handoff groups, which can be selected based on various criteria including strength of each group. Logical grouping 1002 can also include an electrical component for notifying the master sector of the selected softer handoff group 1008.

In accordance with some aspects, logical grouping 1002 may include an electrical component for receiving information from at least two sectors participating in a softer handoff group. For example, the information can include the sectors that are able (and willing) to participate in the softer handoff group. Also included is an electrical component for determining a master sector from the at least two sectors. The master sector can be the sector chosen from the base stations that can participate in the softer handoff group. The means for determining a master sector from the at least two sectors can receive a pilot transmitted by each of the at least two sectors and ascertain a strength of each sector based on the received pilots.

Also included in logical grouping may be an electrical component for creating a CQI report for the master sector. The CQI report is creating by ignores information relating to the other sectors in the group. Further, logical grouping can also include an electrical component for scrambling the CQI report with an index associated with the softer handoff group and an electrical component for sending the scrambled CQI report and index on a CQI channel.

In accordance with some aspects, logical grouping 1002 can include an electrical component for estimating a channel for each sector based on the received pilots, an electrical component for combining the channel estimates and an electrical component for utilizing the combined channel estimates to demodulate data. Additionally or alternatively, logical grouping 1002 can include an electrical component for communicating with the master sector, wherein the communication is received by the master sector or a different sector in the softer handoff group. In accordance with some aspects, logical grouping 1002 can include an electrical component for receiving information from the master sector. The information can be from the master sector or from a different sector participating in the softer handoff group. The information from a different sector participating in the softer handoff group is information that appears to be the information sent by the master sector.

Additionally, system 1000 can include a memory 1010 that retains instructions for executing functions associated with electrical components 1004, 1006, and 1008, or other components. While shown as being external to memory 1010, it is to be understood that one or more of electrical components 1004, 1006, and 1008, may exist within memory 1010.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for enabling softer handoff groups, comprising:
providing a fractional frequency reuse set associated with a softer handoff group, wherein the softer handoff group comprises at least two sectors, and wherein the fractional frequency reuse set provides that each sector in the softer handoff group uses the same modulation symbols on the same subcarrier for downlink transmissions to an access terminal associated with said softer handoff group, so that the access terminal can combine downlink transmissions from the sectors of said softer handoff group to demodulate signals transmitted from said sectors; and
managing the fractional frequency reuse set by a master sector, the master sector being part of the softer handoff group.

2. The method of claim 1, further comprising:
mimicking a signal of the master sector by a second sector; and
transmitting the mimicked signal to the access terminal.

3. The method of claim 1, further comprising:
determining whether to continue serving a plurality of terminals by group; and
transmitting an active set update to reduce a group size to one if the determination is to not continue serving the plurality of terminals by group.

4. The method of claim 3, further comprising: determining whether to continue serving a plurality of terminals by group comprises reviewing pilots, channel quality indicator reports, automatically when the group size is reduced to one, or combinations thereof.

5. The method of claim 1, further comprising: allowing a terminal to select a serving sector from the softer handoff group, wherein the softer handoff group comprises at least two serving sectors.

6. A wireless communications apparatus, comprising:
a processor that executes instructions for providing a fractional frequency reuse set associated with a softer handoff group, and managing the fractional frequency reuse set by a master sector, wherein the softer handoff group comprises at least two sectors, and wherein the fractional frequency reuse set provides that each sector in the softer handoff group uses the same modulation symbols on the same subcarrier for downlink transmissions to an access terminal associated with said softer handoff group, so that the access terminal can combine downlink transmissions from the sectors of said softer handoff group to demodulate signals transmitted from said sectors; and
a memory that stores information related to a group identification and the softer handoff group generated by the processor.

7. The wireless communications apparatus of claim 6, wherein the processor further executes instructions for:
determining whether to continue serving a plurality of terminals by group; and
transmitting an active set update to reduce a group size to one if the determination is to not continue serving the plurality of terminals by group.

8. The wireless communications apparatus of claim 7, wherein to determine whether to continue serving a plurality of terminals by group the processor further executes instructions for reviewing pilots, channel quality indicator reports, automatically when the group size is reduced to one, or combinations thereof.

9. The wireless communications apparatus of claim 6, wherein the processor further executes instructions for:
mimicking a signal of the master sector with a signal of a second sector; and
transmitting the mimicked signal to the access terminal.

10. The wireless communications apparatus of claim 6, wherein the processor further executes instructions for allowing a terminal to choose a serving sector from the softer handoff group, wherein the softer handoff group comprises at least two serving sectors.

11. A wireless communications apparatus that provides a softer handoff group, comprising:
means for providing a fractional frequency reuse set associated with a softer handoff group, wherein the softer handoff group comprises at least two sectors, and wherein the fractional frequency reuse set provides that each sector in the softer handoff group uses the same modulation symbols on the same subcarrier for downlink transmissions to an access terminal associated with said softer handoff group, so that the access terminal can combine downlink transmissions from the sectors of said softer handoff group to demodulate signals transmitted from said sectors; and
means for managing the fractional frequency reuse set by a master sector, the master sector being part of the softer handoff group.

12. The wireless communications apparatus of claim 11, further comprising:
means for copying a signal of the master sector with a signal of a second sector; and
means for sending the copied signal to the access terminal being served by the master sector.

13. The wireless communications apparatus of claim 11, further comprising:
means for deciding whether to continue serving a plurality of terminals by group; and
means for transmitting an active set update to reduce a group size to one if the determination is to not continue serving the plurality of terminals by group.

14. The wireless communications apparatus of claim 13, further comprising:
means for reviewing pilots and channel quality indicator reports; and
means for detecting if a group size is reduced to one.

15. The wireless communications apparatus of claim 13, further comprising:
means for allowing a terminal to determine which sector within the softer handoff group is to serve the terminal.

16. A non-transitory machine-readable medium having stored thereon machine-executable instructions for:
providing a fractional frequency reuse set associated with a softer handoff group, wherein the softer handoff group comprises at least two sectors, and wherein the fractional frequency reuse set provides that each sector in the softer handoff group uses the same modulation symbols on the same subcarrier for downlink transmissions to an access terminal associated with said softer handoff group, so that the access terminal can combine downlink transmissions from the sectors of said softer handoff group to demodulate signals transmitted from said sectors; and
managing the fractional frequency reuse set by a master sector, the master sector being part of the softer handoff group.

17. The machine-readable medium of claim 16, the instructions further comprising:

determining whether to continue serving a plurality of terminals by group; and transmitting an active set update to reduce a group size to one if the determination is to not continue serving the plurality of terminals by group.

18. The machine-readable medium of claim 17, wherein to determine whether to continue serving a plurality of terminals by group reviewing pilots, a channel quality indicator reports, automatically when the group size is reduced to one, or combinations thereof.

19. The machine-readable medium of claim 16, the instructions further comprising:

impersonating the master sector with a signal of a second sector; and transmitting the signal of the second sector to the access terminal.

20. The machine-readable medium of claim 16, the instructions further comprising:

allowing a terminal to determine which sector within the softer handoff group is to serve the terminal.

21. An apparatus operable in a wireless communication system, the apparatus comprising:

a processor configured to:

provide a fractional frequency reuse set associated with a softer handoff group, wherein the softer handoff group comprises at least two sectors, and wherein the fractional frequency reuse set provides that each sector in the softer handoff group uses the same modulation symbols on the same subcarrier for downlink transmissions to an access terminal associated with said softer handoff group, so that the access terminal can combine downlink transmissions from the sectors of said softer handoff group to demodulate signals transmitted from said sectors, manage the fractional frequency reuse set using a master sector, the master sector being part of the softer handoff group; and a memory coupled to the processor for storing data.

22. A method for selecting softer handoff groups, comprising:

determining a master sector as a serving sector;

choosing a softer handoff group that is offered by the master sector; and indicating the chosen softer handoff group to the master sector, wherein the softer handoff group comprises at least two sectors, and wherein each sector in the softer handoff group uses the same modulation symbols on the same subcarrier for downlink transmissions to an access terminal associated with said softer handoff group, so that the access terminal can combine downlink transmissions from the sectors of said softer handoff group to demodulate signals transmitted from said sectors.

23. The method of claim 22, further comprising:

receiving information from at least two sectors participating in a softer handoff group;

creating a CQI report for the master sector;

scrambling the CQI report with an index associated with the softer handoff group; and sending the scrambled CQI report and index on a CQI channel.

24. The method of claim 23, further comprising:

receiving at least two pilots, each pilot transmitted from each of the at least two sectors;

estimating a channel for each sector based on the received pilots;

combining the channel estimates; and utilizing the combined channel estimates to demodulate data.

25. The method of claim 22, determining a master sector from the at least two sectors comprises:

receiving a pilot transmitted by each of the at least two sectors; and determining a strength of each sector based on the received pilots.

26. The method of claim 22, further comprising:

communicating with the master sector, wherein the communication is received by the master sector or a different sector in the softer handoff group.

27. The method of claim 22, further comprising:

receiving information from the master sector, wherein the information is from the master sector or from a different sector participating in the softer handoff group.

28. The method of claim 27, wherein the information from a different sector participating in the softer handoff group is information that appears to be the information sent by the master sector.

29. A wireless communications apparatus, comprising:

a processor that executes instructions for determining a master sector as a serving sector, determining a desired softer handoff group offered by the master sector, and communicating the desired softer handoff group to the master sector, wherein the softer handoff group comprises at least two sectors, and wherein each sector in the softer handoff group uses the same modulation symbols on the same subcarrier for downlink transmissions to an access terminal associated with said softer handoff group, so that the access terminal can combine downlink transmissions from the sectors of said softer handoff group to demodulate signals transmitted from said sectors; and a memory that stores information generated by the processor.

30. The wireless communications apparatus of claim 29, wherein the processor further executes instructions for receiving information from at least two sectors participating in a softer handoff group, creating a CQI report for the master sector, scrambling the CQI report with an index associated with the softer handoff group, and transmitting the scrambled CQI report and index on a CQI channel.

31. The wireless communications apparatus of claim 29, wherein the processor further executes instructions for receiving at least two pilots, each pilot transmitted from each of the at least two sectors, estimating a channel for each sector based on the received pilots, combining the channel estimates, and utilizing the combined channel estimates to demodulate data.

32. The wireless communications apparatus of claim 29, wherein the processor further executes instructions for receiving a pilot transmitted by each of the at least two sectors and determining a strength of each sector based on the received pilots.

33. The wireless communications apparatus of claim 29, wherein the processor further executes instructions for communicating with the master sector, wherein the communication is received by the master sector or a different sector in the softer handoff group.

34. The wireless communications apparatus of claim 29, wherein the processor further executes instructions for receiving information from the master sector, wherein the information is from the master sector or from a different sector participating in the softer handoff group.

35. The wireless communications apparatus of claim 33, wherein the information from a different sector participating in the softer handoff group is information that appears to be the information sent by the master sector.

36. A wireless communications apparatus that selects a softer handoff group, comprising:
   means for identifying a master sector as a serving sector;
   means for selecting a softer handoff group offered by the master sector;
   means for notifying the master sector of the selected softer handoff group,
   wherein the softer handoff group comprises at least two sectors, and wherein each sector in the softer handoff group uses the same modulation symbols on the same subcarrier for downlink transmissions to an access terminal associated with said softer handoff group, so that the access terminal can combine downlink transmissions from the sectors of said softer handoff group to demodulate signals transmitted from said sectors.

37. The wireless communications apparatus of claim 36, wherein the means for selecting a master sector further receives a pilot transmitted by each of at least two sectors and ascertains a strength of each sector based on the received pilots.

38. The wireless communications apparatus of claim 36, further comprising:
   means for communicating with the master sector, wherein the communication is received by the master sector or a different sector in the softer handoff group.

39. The wireless communications apparatus of claim 36, further comprising:
   means for receiving information from the master sector, wherein the information is from the master sector or from a different sector participating in the softer handoff group, the information from a different sector participating in the softer handoff group is information that appears to be the information sent by the master sector.

40. A non-transitory machine-readable medium having stored thereon machine-executable instructions for:
   selecting a master sector as a serving sector;
   choosing a softer handoff group being offered by the master sector; and
   communicating the chosen softer handoff group to the master sector,
   wherein the softer handoff group comprises at least two sectors, and wherein each sector in the softer handoff group uses the same modulation symbols on the same subcarrier for downlink transmissions to an access terminal associated with said softer handoff group, so that the access terminal can combine downlink transmissions from the sectors of said softer handoff group to demodulate signals transmitted from said sectors.

41. The machine-readable medium of claim 40, the instructions further comprising:
   receiving information from at least two sectors participating in a softer handoff group;
   creating a CQI report for the master sector;
   scrambling the CQI report with an index associated with the softer handoff group; and
   sending the scrambled CQI report and index on a CQI channel.

42. The machine-readable medium of claim 41, the instructions further comprising:
   receiving at least two pilots, each pilot transmitted from each of the at least two sectors;
   estimating a channel for each sector based on the received pilots;
   combining the channel estimates; and
   utilizing the combined channel estimates to demodulate data.

43. The machine-readable medium of claim 40, the instructions further comprising: communicating with the master sector, wherein the communication is received by the master sector or a different sector in the softer handoff group.

44. The machine-readable medium of claim 40, the instructions further comprising: receiving information from the master sector, wherein the information is from the master sector or from a different sector participating in the softer handoff group.

45. The machine-readable medium of claim 40, wherein the information from a different sector participating in the softer handoff group is information that appears to be the information sent by the master sector.

46. An apparatus operable in a wireless communication system, the apparatus comprising:
   a processor configured to:
      determine a master sector as its chosen sector;
      choosing a softer handoff group offered by the master sector; and
      informing the master sector of the chosen softer handoff group,
      wherein the softer handoff group comprises at least two sectors, and wherein each sector in the softer handoff group uses the same modulation symbols on the same subcarrier for downlink transmissions to an access terminal associated with said softer handoff group, so that the access terminal can combine downlink transmissions from the sectors of said softer handoff group to demodulate signals transmitted from said sectors.

* * * * *